(12) United States Patent
Ichikawa

(10) Patent No.: US 7,794,533 B2
(45) Date of Patent: Sep. 14, 2010

(54) OIL-BASED INK COMPOSITION FOR WRITING UTENSIL AND WRITING UTENSIL EMPLOYING THE SAME

(75) Inventor: Shuji Ichikawa, Yokohama (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 112 days.

(21) Appl. No.: 12/084,782

(22) PCT Filed: Sep. 20, 2006

(86) PCT No.: PCT/JP2006/319086

§ 371 (c)(1),
(2), (4) Date: May 9, 2008

(87) PCT Pub. No.: WO2007/055070

PCT Pub. Date: May 18, 2007

(65) Prior Publication Data

US 2009/0255439 A1    Oct. 15, 2009

(30) Foreign Application Priority Data

Nov. 11, 2005    (JP) .............................. 2005-327702

(51) Int. Cl.
C09D 11/00    (2006.01)
(52) U.S. Cl. .................. 106/31.58; 106/31.86
(58) Field of Classification Search .............. 106/31.58, 106/31.86
See application file for complete search history.

(56) References Cited

U.S. PATENT DOCUMENTS

| 5,158,606 | A | * | 10/1992 | Carlick et al. | ............... 524/145 |
|---|---|---|---|---|---|
| 5,345,254 | A | * | 9/1994 | Wong et al. | .................. 347/100 |
| 6,206,960 | B1 | * | 3/2001 | Smith et al. | .................. 106/500 |
| 6,379,444 | B1 | * | 4/2002 | Adkins et al. | ............... 106/31.6 |
| 6,503,965 | B1 | * | 1/2003 | Nowak et al. | ............... 523/161 |
| 2003/0149133 | A1 | * | 8/2003 | Lau et al. | ..................... 523/160 |
| 2003/0171481 | A1 | * | 9/2003 | Toyoda | ........................ 524/502 |
| 2004/0035321 | A1 | * | 2/2004 | Mihan et al. | ............. 106/31.29 |
| 2007/0060669 | A1 | * | 3/2007 | Yoda et al. | ................... 523/160 |

FOREIGN PATENT DOCUMENTS

| JP | 7-268268 | A | 10/1995 |
|---|---|---|---|
| JP | 9-302298 | A | 11/1997 |
| JP | 2003-26983 | A | 1/2003 |
| JP | 2004-99819 | A | 4/2004 |
| WO | WO 2005030889 A1 * | | 4/2005 |

* cited by examiner

*Primary Examiner*—Jerry Lorengo
*Assistant Examiner*—Veronica Faison Gee
(74) *Attorney, Agent, or Firm*—Foley & Lardner LLP

(57) ABSTRACT

The present invention provides an ink composition containing an olefinic wax dispersion added so as to impart smooth writing properties without causing starving at the starting of writing, and the ink composition has noticeably improved stability over time. The present invention provides an oil-based ink composition comprising a solvent selected from the group consisting of a monohydric alcohol, a polyhydric alcohol and glycol ether, and a colorant selected from the group consisting of a pigment, a dye, and a mixture of the pigment and the dye, the oil-based ink composition further comprising a dispersion of reprecipitated olefinic wax particles.

3 Claims, No Drawings

OIL-BASED INK COMPOSITION FOR WRITING UTENSIL AND WRITING UTENSIL EMPLOYING THE SAME

CROSS-REFERENCE TO RELATED APPLICATIONS

This application is a National Stage application of PCT/JP2006/319086, filed Sep. 20, 2006, which claims priority from Japanese application JP 2005-327702, filed Nov. 11, 2005.

FIELD OF THE INVENTION

The present invention relates to an oil-based ink composition, and specifically, to an oil-based ink composition for use in an oil-based ink pen or an oil-based ball point ink pen, and also relates to a writing instrument using the oil-based ink composition.

BACKGROUND OF THE INVENTION

Wax is added as a blending material to be added to an oil-based ink composition for use in writing instruments such as an oil-based ink pen or an oil-based ball point ink pen and desk supplies. Wax is also used in ink for a writing instrument for various purposes utilizing solubility and interfacial film formability. Such an example is described in Japanese Unexamined Patent Publication (Kokai) No. 11-335612, Japanese Unexamined Patent Publication (Kokai) No. 2001-240788, Japanese Unexamined Patent Publication (Kokai) No. 2003-213162 and Japanese Unexamined Patent Publication (Kokai) No. 11-92706.

It is described in Japanese Unexamined Patent Publication (Kokai) No. 11-335612 that a wax oxide is added to an ink composition in order to prevent dry-up when a quick-drying oil-based ink pen is allowed to stand in a state where the cap has been removed, and also discloses that wax oxide is added to the ink composition by merely mixing.

It is described in Japanese Unexamined Patent Publication (Kokai) No. 2003-213162 that paraffin wax is added to correction fluid in order to prevent drying of the tip of a writing instrument type correction device, and also discloses that paraffin wax is added to the ink composition by merely dissolving the paraffin wax and then mixing, it with the correction fluid.

It is described in Japanese Unexamined Patent Publication (Kokai) No. 11-92706 that writing feel is improved by adding a wax having a melting point of 60 to 100° C., specifically carnauba wax, Montan wax or the like to an oil-based ink composition for a ball point pen, but does not describe a specific method of adding these waxes.

When wax-based substances such as polyethylene wax are used in a writing instrument, it is difficult to uniformly mix these waxes with an oil-based ink composition in view of the interfacial film formability and the blending method for dissolving these waxes.

Depending on the presence of the interfacial film formability or the dissolved state of the wax, a wax film may be produced on the vapor-liquid interface of the ink during storage caused with when not used over a long period of time, or caused by a difference in the temperature of the ambient environment, and sediment may also be produced as a result of interaction with raw materials in the ink. Furthermore, a problem may occur when the wax is converted into an undissolved lump or sedimentation of the wax, since wettability of wax with an ink solvent wax is inferior.

Generally, when wax is introduced into an oil-based ink composition, the wax forms a film, which is a foreign matter to the ink composition. Therefore, wax is dispersed so as not to form a film in the ink composition. It has been found that the various problems described above when using a wax-based substance in an oil-based ink composition for a writing instrument are caused by poor stability of a wax dispersion dispersed in the ink composition.

An object of the present invention is to provide an ink composition containing an olefinic wax dispersion added in order to impart smooth writing properties without causing ink starving at the starting of writing, and the ink composition having noticeably improved stability over time.

SUMMARY OF THE INVENTION

The present inventors have intensively studied in order to achieve the above object and found that the object can be achieved by an oil-based ink composition having the features described below, and thus the present invention has been completed.

In one aspect, the present invention is directed to an oil-based ink composition comprising a solvent selected from the group consisting of a monohydric alcohol, a polyhydric alcohol and glycol ether, and a colorant selected from the group consisting of a pigment, a dye, and a mixture of the pigment and the dye, and a resin, the oil-based ink composition further comprising a dispersion of reprecipitated olefinic wax particles.

In another aspect, the present invention is directed to a writing instrument using the above oil-based ink composition.

Formation of a wax film-on a vapor-liquid interfacial film caused by a difference in the temperature of the ambient environment during storage of the ink is suppressed, since the dispersion of olefinic wax particles incorporated is very stable. Stability over time is noticeably improved, since sediment is not generated by interaction between raw materials in the ink and wax particles. Furthermore, conversion into an undissolved lump or sedimentation of the wax does not occur, since the wax is excellent in wettability with an ink solvent.

In addition to the above advantages, the oil-based ink composition of the present invention can exert the following effects by adding an olefinic wax dispersion:
improvement in writing properties (improvement in stickiness in the case of writing);
suppression of ink adhesion (straight flow) at a pen tip when the pen tip is directed downward; and
suppression of excess ink adhering to a pen tip or transferring it to line (blobbing or dotting) upon writing.

Unlike the case where wax particles are added to a solvent or an oil-based ink composition after being formed into a powder, wax is directly formed into particles by precipitating in a solvent to form a dispersion. Therefore, it is advantageous since an oil-based ink is produced without requiring many production processes.

Furthermore, it has been found that the dispersion of reprecipitated olefinic wax particles used in the ink composition of the present invention can also function as an additive which imparts an external visual characteristic since the reprecipitated olefinic wax particles do not interact with other components in the oil-based ink composition to cause aggregation or sedimentation over time, and are therefore very stable. The term "external visual characteristic" means that the appearance of the ink appears to be the same color as that of a drawn line of the ink. Generally, when the colorant of the ink is a dye, the ink may appear to be a dark color, which is closer to black, and thus the appearance color of the ink appears to be quite-different from color of a drawn line of the ink, resulting in a very poor external visual characteristic. The method has been conventionally used in which a white emulsion or particles as additives are mixed with the oil-based ink so as to make the of appearance of the ink match that of a drawn line of the ink, i.e. to impart the external visual characteristic. However, this method has many problems when an intermediate polar solvent is used as the ink solvent. The oil-based ink composition of the present invention has an advantage in that it has good an external visual characteristics even when a specific additive for imparting an external visual characteristics is not used.

DETAILED DESCRIPTION

Olefinic wax, which can be used in the oil-based ink composition of the present invention, is a wax having a dropping point of 70° C. or higher and 200° C. or lower. As used herein, the dropping point refers to the temperature at which the wax begins to drop in the form of a liquid at high temperature. Specific examples of the olefinic wax include a polyethylene wax, a polypropylene wax, a low molecular weight ionomer wax, and a polytetrafluoroethylene wax.

Polyethylene wax and polypropylene wax are particularly preferred olefinic waxes.

Specific examples of the polyethylene wax, which can be used in the present invention, include 30200B manufactured by Mitsui Chemicals, Inc. (ethylene-butene copolymer); 2203A, 1105 and 45192BA manufactured by Mitsui Chemicals, Inc. (carboxylic acid modified ethylene-butene copolymer); HW26502PE manufactured by Mitsui Chemicals, Inc. (oxidized ethylene-propylene copolymer); and A-C6 and 6A, A-C8 and 8A, A-C9 and 9A, A-C617 and 617A, and A-C629 and 629A manufactured by Honey Well Company. Specific examples thereof also include Neowax (melting point: 105° C.) manufactured by YASUHARA CHEMICAL CO., LTD.

Furthermore, polyethylene wax and polypropylene wax, which have been subjected to an oxidation treatment thereby introducing a polar group, or subjected to acrylic acid copolymerization, vinyl acetate copolymerization, oxidation polymerization, or maleic anhydride copolymerization, are also preferred.

In the polyolefinic wax dispersion obtained by preparing the dispersion of the present invention, dispersed particles have a diameter of 10 nm to 50 μm.

A nonpolar medium, which dissolves the olefinic wax used in the oil-based ink composition of the present invention, satisfies the following conditions taking into account the following precipitation step:

(1) a medium which is compatible with the olefinic wax at a temperature within a range from 60 to 250° C.;

(2) a medium which is compatible with a solvent having a glycol etheric hydroxyl group;

(3) a medium in which solubility of the olefinic wax is 10% by mass or less at a temperature of 0° C. or higher and 50° C. or lower; and (4) a medium having a boiling point of 150° C. or higher.

A medium which is compatible with the olefinic wax at a lower temperature of 60° C. sometimes dissolves the olefinic wax even in a conventional indoor environment. A medium which is compatible with the olefinic wax at a temperature of higher than 250° C. involves some risk because the temperature is too high to carry out during reprecipitation into particles and to employ a solvent as a disperse medium. Compatibilization of the medium with a solvent having an alcoholic hydroxyl group as a solvent having medium polarity causes the nonpolar medium to easily transfer from precipitated particles to the solvent in the next precipitation step. Conditions of solubility of the olefinic wax of 10% by mass or less at a temperature of 0° C. or higher and 50° C. or lower cause the wax to be easily formed into particles upon formation into reprecipitated particles by maintaining a state in which the wax is less dissolved.

Furthermore, the boiling point of the medium is preferably 150° C. or higher so as to secure safety at work when the olefinic wax is dissolved.

Examples of the nonpolar solvent which can be used in the dispersion for a writing instrument of the present invention include a monoterpene-based solvent or a liquid terpene-based resin. Terpene resins are preferably monoterpenes which are liquid at room temperature. Monoterpenes may be either a cyclic monoterpene or a noncyclic monoterpene.

Specific examples of the monoterpene-based solvent include pinene (dicyclic monoterpene) such as α-Pinene and β-Pinene (trade names) manufactured by YASUHARA CHEMICAL CO., LTD.; myrcene (monocyclic monoterpene); limonene (monocyclic monoterpene) such as D-Limonene N (trade name) manufactured by YASUHARA CHEMICAL CO., LTD.; terpinolene (monocyclic monoterpene) such as Terpinolene (trade name) manufactured by YASUHARA CHEMICAL CO., LTD.; cineol (dicyclic monoterpene) such as Cineol D and Cineol C (trade names) manufactured by YASUHARA CHEMICAL CO., LTD.; anethole (monoicyclic monoterpene) such as Anethole G and Anethole U (trade name) manufactured by YASUHARA CHEMICAL CO., LTD.; terpineol (monoicyclic monoterpene) such as Terpineol (trade name) manufactured by YASUHARA CHEMICAL CO., LTD.; and perilla oil (monoicyclic monoterpene) such as Pella oil (trade name) manufactured by YASUHARA CHEMICAL CO., LTD.

Examples of the liquid terpene-based resin include Dimerone (trade name, terpene low grade polymer), Dimer Resin (trade name, modified terpene low grade polymer) and YS Oil DA (trade name, terpene low grade polymer) manufactured by YASUHARA CHEMICAL CO., LTD.

The liquid terpene-based resin also includes n-Borneol, dl-Camphor, I-Carveol, I-Carvyl acetate, Caryophyllene, Caryophyllene oxide, 1,4-Cineole, 1,8-Cineole, Citronellal, I-Citroncol, p-Cymene, d-Dihydrocarveol, I-Dihydrocarveol, d-Dihydrocarvone, d-Hydrocarvyl acetate, I-Dihydrocarvyl acetate, Dihydroterpineol, Dihydroterpinyl acetate, Dimal H, Elemene, Eugenol, β-Framesene, Isobornyl acetate, Isobornyl cyclohexanol, d-Limonene, I-Limonene, d-Liomoene oxide, I-Liomoene oxide, Linalool furanoid, Linalool oxide pyranoid, p-Menthane, I-Menthol, I-Menthone, β-Myrcene, Myrtenal, Myrtenol, Myrtenyl acetate, I-perillyl alcohol, I-Perillyl acetate, 3-Octanol, 3-Octyl acetate, I-Pcrillaldehyde, α-Piene, β-Pinene, α-Pinene oxide, d-Puregone, dl-Rose oxide, Sobrerol, α-Terpinene, γ-Terpinene, Terpineol C, α-Terpineol, I-α-Terpineol, Terpinolene, α-Terpinyl acetate, Verbenol, Verbenone, 3-Carene, Carane oxide, Terusolve DTO-210, Terusolve THA-90, Terusolve THA-70, Terpinyloxy ethanol, Dihydroterpinyloxy ethanol, and Terpinyloxy methylether, Dihydroterpinyl methylether manufactured by Nippon Terpene Chemicals, Inc., and products containing the same as a main component.

The solvent used to precipitate wax particles from a medium containing the above olefinic wax dissolved therein is a solvent selected from the group consisting of a monohydric alcohol, a polyhydric alcohol, and glycolether. Those having a boiling point of 70° C. or higher are particularly preferred, since the danger in handling when manufacturing can be avoided.

Monohydric alcohols include, for example, an aliphatic alcohol having 2 or more carbon atoms, and specific examples thereof include ethanol, n-propanol, isopropanol, n-butanol, isobutanol, tert-butyl alcohol, 1-pentanol, isoamyl alcohol, sec-amyl alcohol, 3-pentanol, tert-amyl alcohol, n-hexanol, methyl amyl alcohol, 2-ethyl butanol, n-heptanol, 2-heptanol, 3-heptanol, n-octanol, 2-octanol, 2-ethyl hexanol, 3,5,5-trimethyl hexanol, nonanol, n-decanol, undecanol, trimethyl nonyl alcohol, teradecanol, heptadecanol, cyclohexanol, 2-methylcyclohexanol, and other various higher alcohols.

Examples of the polyhydric alcohol include polyhydric alcohols having two or more carbons and two or more hydroxyl groups in the molecule, such as ethylene glycol, diethylene glycol, 3-methyl-1,3-butanediol, triethylene glycol, dipropylene glycol, 1,3-propandiol, 1,3-butanediol, 1,5-pentandiol, hexylene glycol, and octylene glycol.

Examples of the glycolether include methyl isopropyl ether, ethyl ether, ethyl propyl ether, ethyl butyl ether, isopropyl ether, butyl ether, hexyl ether, 2-ethyl hexyl ether, ethylene glycol monohexyl ether, ethylene glycol mono-2-ethyl butyl ether, ethylene glycol monomethyl ether, ethylene glycol monoethyl ether, ethylene glycol monobutyl ether, diethylene glycol monoethyl ether, diethylene glycol monobutyl ether, triethylene glycol monobutyl ether, tetraethylene glycol monobutyl ether, 3-methyl-3-methoxy-1-butanol, 3-methyl-1-butanol, propylene glycol monomethyl ether, propylene glycol monoethyl ether, propylene glycol monopropyl ether, propylene glycol monobutyl ether, propylene glycol-tert-butyl ether, dipropylene glycol monoethyl ether, dipropylene glycol monoethyl ether, dipropylene glycol monopropyl ether, dipropylene glycol monobutyl ether, tripropylene glycol monomethyl ether, tripropylene glycol monobutyl ether, and tetrapropylene glycol monobutyl ether, A particularly preferred solvent is a solvent represented by following chemical formula 1:

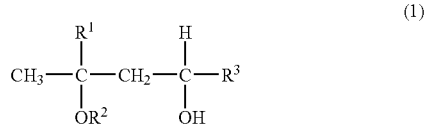

(1)

wherein $R^1$, $R^2$ and $R^3$ each independently represents H or $CH_3$.

Examples of the solvent having the chemical formula (1) include propylene glycol monomethyl ether, 1,3-butanediol, 3-metoxy-1-butanol, and 3-methyl-3-methoxy-1-butanol.

When the olefinic wax used in the oil-based ink composition of the present invention is precipitated in the solvent thereby forming into particles or dispersing, a dispersant can be used. The dispersant is particularly a surfactant or a polymer resin.

A preferable surfactant is a polymer substance which has 5 to 300 repeating units of polyoxyethylene (POE) or polyoxypropylene in the molecule, or a combination of 5 to 300 repeating units of polyoxyethylene and polyoxypropylene in the molecule.

Specific examples of the surfactant which can be used as the dispersant include sorbitan fatty acid esters, polyoxyethylene sorbitan fatty acid esters, polyoxyethylene sorbitol fatty acid esters, glycerin/polyglycerin fatty acid ester and acetate esters, propylene glycol fatty acid esters, ethylene oxide derivatives of glycerin/propylene glycol fatty acid ester, polyoxyethylene alkyl ethers, polyoxyethylene polyoxypropylene alkyl ethers, polyoxyethylene alkyl phenyl ethers, polyoxyethylene castor oil/hardened castor oil derivatives, lanoline/beeswax derivatives, polyoxyethylene alkylamine and fatty acid amides, and derivatives thereof. Commercially available surfactants may be used.

When the surfactant is added, the amount is not more than two times more than the mass of the olefinic wax used to form wax particles.

A polymer resin used as the dispersant is a polymer resin which is dissolved in a solvent in which the above wax particles are precipitated in a concentration of 5% or more at 25° C. Examples of the preferable resin include resins which are dissolved in a glycolmonoether in a concentration of 10% by mass or more, such as a ketone resin, a styrene resin, a styrene-acrylic resin, a terpenephenol resin, a rosin-modified maleic acid resin, a rosinphenol resin, a an alkylphenol resin, a phenoic resin, a styrene maleic acid resin, a rosin-based resin, an acrylic resin, a urea aldehyde-based resin, a maleic acid-based resin, a cyclohexanone-based resin, polyvinyl butyral, and polyvinyl pyrrolidone. Of these resins, a styrene-acrylic resin, a ketone resin, a maleic acid-based resin and a phenolic resin are particularly preferred. When the polymer resin is added, the amount is the same as or less than the mass of the olefinic wax used to form wax particles.

The olefinic wax dispersion used in the oil-based ink composition of the present invention is prepared by preparing a polyethylene or polypropylene wax having a dropping point of 100° C. or higher as the olefinic wax for formation of wax particles, mixing the wax with a nonpolar medium such as a liquid terpene resin, and heating to a temperature within a range from 70 to 160° C. followed by stirring, thereby dissolving a solid wax. The solution thus prepared is cooled to a temperature within a range from 70 to 100° C. Then, a solvent which is compatible with glycolether heated to a temperature within a range from 70 to 100° C., for example, 3-methoxy, 3-methyl and 1-butanol, is gradually added to the wax solution. In this case, a predetermined amount of a dispersant for surface coating, POE(5)alkyl alcohol, is preliminarily dissolved in 3-methyl-3-methoxy-1-butanol. When the solvent is gradually added to the wax solution, the olefinic wax, which has been dissolved, is precipitated and formed into particles to obtain a dispersion. Furthermore, the dispersion is continuously stirred, and allowed to cool by standing. The dispersant for surface coating, POE(5)alkyl alcohol, can also be added at this time. The olefinic wax dispersion can be obtained by the above procedures.

The solvent used in the oil-based ink composition of the present invention is the same type as that of the solvent used to prepare a wax dispersion. Therefore, the ink solvent used in the oil-based ink composition of the present invention is a solvent selected from the group consisting of a monohydric alcohol, a polyhydric alcohol and glycolether. The amount of the solvent as the ink solvent selected from the group consisting of a monohydric alcohol, a polyhydric alcohol and glycolether is from 50 to 100% by mass based on the total amount of the ink, and the solvent is a prime solvent.

The solvent used in the oil-based ink composition of the present invention has a vapor pressure of 0.001 mmHg or higher at 25° C., and more preferably 0.1 mmHg or higher.

When the vapor pressure of the solvent is too low, problems such as drawn line dryability and strike-through of ink may arise when a line is drawn on the surface of paper using the oil-based ink composition. When the vapor pressure of the solvent is too high, in the case of a ball point pen, the solvent is volatilized from the pen tip and write-starting characteristics become worse, and thus it may become impossible to write. Even when volatilization is directly suppressed by placing an ink follower on a pen refill rear end portion, a problem may arise that the solvent passes through the ink follower over time and makes physical properties of the ink vary.

In the ball point pen used in the oil-based ink composition of the present invention, such a problem does not arise when the above preferred solvent is used. It is preferable to fill the ink refill rear end portion with the ink follower so as to suppress moisture absorption of the ink solvent.

Specific examples of the solvent which can be used in the oil-based ink composition of the present invention are the same as those listed in the description of the olefinic wax dispersion.

These solvents are preferred in view of performance, safety and oral toxicity of the oil-based ink composition involved in the vapor pressure of the solvent.

It is possible to use, as the dye used in the oil-based ink composition of the present invention, any dye used in a conventional oil-based ink composition as long as the dye to be used does not change the olefinic wax dispersion.

It is possible to use, as the dye, any dye selected from a direct dye, an acid dye, a basic dye, a mordanting/acid mordant dye, a spirit soluble dye, an azoic dye, a sulphidizing/sulfur vat dye, a vat dye, a disperse dye, an oil soluble dye, an food dye, a metal complex dye, a salt-forming dye, and a dye obtained by dyeing a resin with a dye. The amount of the dye can range from 1 to 50% by mass based on the total amount of the ink.

Examples of the salt-forming dye used in a conventional oil-based ink composition include VALIFAST® colors manufactured by Orient Chemical Industries, Ltd., an Eisenspiron dye, and an Aisen® SOT dye manufactured by Hodogaya Chemical Co., Ltd.

Examples of the dye obtained by dyeing a resin with a dye include kieko-Colot MPI-500 series, kieko-Colot MPI-500C series, and kieko-Colot NKS-1000 series.

To the oil-based ink composition of the present invention, colorants, resins, surfactants, and auxiliary solvents can be added so as to improve writing performance of a ball point pen, in addition to dispersions and dyes. Furthermore, it is possible to mix with rust preventing agents, mildew-proofing agents, lubricants, and humectants which can be compatibilized without exerting an adverse influence on the oil-based ink composition.

As the auxiliary solvent, not only can an aliphatic solvent, be used but an aromatic solvent can also be used. Particularly, benzyl alcohol and ethylene glycol monophenyl ether are sometimes preferably used as the auxiliary solvent, since they are effective as a solubilizing aid of the dye.

Specific examples of the writing instrument of the present invention include an oil-based ink sign pen and an oil-based ink ball point pen. The oil-based ink ball point pen comprises a ball, a pen tip composed of a tip holder, an ink reservoir tube, a joint for joining the tip and the tube, and a penholder, and the ink reservoir tube is filled with the ink composition of the present invention.

When the ink composition of the present invention is used as an ink for a ball point pen, an ink follower is preferably placed on a ball point pen refill rear end portion for the following reason. The ink follower is effective to prevent volatilization, moisture absorption and ink leakage since the solvent used has volatility.

EXAMPLES

The present invention will be described below by way of examples, but the present invention is not limited to these following examples. In the following examples, percentages are by mass. A dispersion of reprecipitated olefinic wax particles used in the preparation of the ink is preliminarily prepared, and is sealed in a glass bottle.

(Examples 1 to 40) and (Comparative Examples 1 to 32) are as described below. In the following examples, a dispersion of reprecipitated olefinic wax particles and an ink composition for evaluation were added in each predetermined amount, followed by mixing in a constant-temperature bath at 40° C. or higher to obtain a final ink composition.

<Dispersion of Reprecipitated Olefinic Wax Particles-1>

| | |
|---|---|
| Olefinic wax: AC-9A | 6.0% |
| Olefinic wax dissolving medium: YS Oil DA | 30.0% |
| Solvent compatible with glycolether: 3-methyl-3-methoxy-1-butanol | 58.0% |
| Dispersant for surface coating: POE(40)lanoline alcohol | 6.0% |

The dispersion of reprecipitated olefinic wax particles was prepared by the following procedure.

In a container, the olefinic wax AC-9A and the medium YS Oil DA for dissolving the olefinic wax were charged in each predetermined amount, followed by heating with stirring at a temperature within a range from 70 to 160° C. Then, the temperature was adjusted to a temperature within a range from 70 to 100° C. by cooling. When a solution prepared by dissolving a predetermined amount of the dispersant POE(40)lanoline alcohol in the solvent 3-methyl-3-methoxy-1-butanol and heating to a temperature within a range from 70 to 100° C. is gradually added to the wax solution, the dissolved olefinic wax was formed into particles by precipitating in 3-methyl-3-methoxy-1-butanol to obtain a dispersion. Furthermore, the dispersion was continuously stirred while cooling with standing to obtain an olefinic wax dispersion of the present invention.

In Dispersions-2 to 20, the procedure described in <Dispersion of reprecipitated olefinic wax particles-1> was repeated using various olefinic waxes to prepare dispersions of reprecipitated olefinic wax particles (wax dispersions). Formulations of the dispersions used in the respective examples are described below.

<Dispersion of Reprecipitated Olefinic Wax Particles-2>

| | |
|---|---|
| Olefinic wax: AC-629 | 7.0% |
| Olefinic wax dissolving medium: α-Limonene | 12.0% |
| Olefinic wax dissolving medium: Isobornyl cyclohexanol | 8.0% |
| Solvent compatible with glycolether: 3-methyl-3-methoxy-1-butanol | 71.0% |
| Dispersant for surface coating: POE(40)lanoline alcohol | 2.0% |

<Dispersion of Reprecipitated Olefinic Wax Particles-3>

| | |
|---|---:|
| Olefinic wax: 45192BA | 3.0% |
| Olefinic wax dissolving medium: YS Oil DA | 20.0% |
| Solvent compatible with glycolether: 3-methyl-3-methoxy-1-butanol | 76.0% |
| Dispersant for surface coating: POE(15)Octyl phenyl ether | 1.0% |

<Dispersion of Reprecipitated Olefinic Wax Particles-4>

| | |
|---|---:|
| Olefinic wax: AC-597 | 8.0% |
| Olefinic wax dissolving medium: YS Oil DA | 25.0% |
| Solvent compatible with glycolether: 3-methyl-3-methoxy-1-butanol | 60.0% |
| Dispersant for surface coating: POE(20)POP(80)cetylether | 7.0% |

<Dispersion of Reprecipitated Olefinic Wax Particles-5>

| | |
|---|---:|
| Olefinic wax: AC-8A | 5.0% |
| Olefinic wax dissolving medium: p-Menthane | 5.0% |
| Olefinic wax dissolving medium: Isobornyl cyclohexanol | 10.0% |
| Solvent compatible with glycolether: 3-methyl-3-methoxy-1-butanol | 77.0% |
| Dispersant for surface coating: POE(4)oleylether | 3.0% |

<Dispersion of Reprecipitated Olefinic Wax Particles-6>

| | |
|---|---:|
| Olefinic wax: LA05 | 4.0% |
| Olefinic wax dissolving medium: YS Oil DA | 18.0% |
| Solvent compatible with glycolether: 3-methyl-3-methoxy-1-butanol | 74.0% |
| Dispersant for surface coating: POE(23)laurylether | 4.0% |

<Dispersion of Reprecipitated Olefinic Wax Particles-7>

| | |
|---|---:|
| Olefinic wax: AC-629 | 5.0% |
| Olefinic wax dissolving medium: Dihydroterpinyl acetate | 25.0% |
| Solvent compatible with glycolether: 3-methyl-3-methoxy-1-butanol | 68.0% |
| Dispersant for surface coating: POE(5)lanoline alcohol | 2.0% |

<Dispersion of Reprecipitated Olefinic Wax Particles-8>

| | |
|---|---:|
| Olefinic wax: HW26502PE | 8.0% |
| Olefinic wax dissolving medium: YS Oil DA | 25.0% |
| Solvent compatible with glycolether: 3-methyl-3-methoxy-1-butanol | 65.0% |
| Dispersant for surface coating: Polyvinyl butyral | 2.0% |

<Dispersion of Reprecipitated Olefinic Wax Particles-9>

| | |
|---|---:|
| Olefinic wax: AC-597 | 5.0% |
| Olefinic wax dissolving medium: YS Oil DA | 25.0% |
| Solvent compatible with glycolether: 3-methyl-3-methoxy-1-butanol | 68.0% |
| Dispersant for surface coating: POE(15.2)Tribenzyl phenyl ether | 2.0% |

<Dispersion of Reprecipitated Olefinic Wax Particles-10>

| | |
|---|---:|
| Olefinic wax: 2203A | 8.0% |
| Olefinic wax dissolving medium: YS Oil DA | 25.0% |
| Solvent compatible with glycolether: 3-methyl-3-methoxy-1-butanol | 65.0% |
| Dispersant for surface coating: Resin SK | 2.0% |

<Dispersion of Reprecipitated Olefinic Wax Particles-11> for Comparative Example An olefinic wax: Neowax LA05 was added to a solvent compatible with glycolether: 3-methyl-3-methoxy 1-butanol in the form of a powder without dissolving the olefinic wax to prepare a dispersion.

The formulation of the resulting dispersion is the same as that described in <Dispersion of reprecipitated olefinic wax particles-6>. A solvent for dissolving an olefinic wax and a dispersant for surface coating were not used, since the olefinic wax was added in the form of a powder without dissolving the olefinic wax.

<Reprecipitated Particle Dispersion-12 of Wax Other than Olefinic Wax> for Comparative Example

| | |
|---|---:|
| Wax: Castol oil-based wax: DISPALON 4300 | 8.0% |
| Wax dissolving medium: YS Oil DA | 25.0% |
| Solvent compatible with glycolether: 3-methyl-3-methoxy-1-butanol | 60.0% |
| Dispersant for surface coating: POE(5)lanoline alcohol | 7.0% |

<Reprecipitated Particle Dispersion-13 of Wax Other than Olefinic Wax> for Comparative Example

| | |
|---|---:|
| Wax: Castol oil-based wax: DISPALON 305 | 8.0% |
| Wax dissolving medium: YS Oil DA | 25.0% |
| Solvent compatible with glycolether: 3-methyl-3-methoxy-1-butanol | 67.0% |

<Reprecipitated Particle Dispersion-14 of Wax Other than Olefinic Wax> for Comparative Example By using the same procedure as used in <Dispersion of reprecipitated olefinic wax particles-1>, except that the olefinic wax AC-9A was replaced with a modified amide wax and a dispersant for surface coating was not used, a dispersion was prepared.

| | |
|---|---:|
| Wax: Modified amide wax DISPALON 6650 | 5.0% |
| Wax dissolving medium: YS Oil DA | 25.0% |
| Solvent compatible with glycolether: 3-methyl-3-methoxy-1-butanol | 70.0% |

<Reprecipitated Particle Dispersion-15 of Wax other than Olefinic Wax> for Comparative Example By using the same procedure as used in <Dispersion of reprecipitated olefinic wax particles-1>, except that the olefinic wax AC-9A was replaced with an amidepolyethylene-based wax and a dispersant for surface coating was not used, a dispersion was prepared.

| | |
|---|---|
| Wax: Amide/polyethylene-based wax DISPALON F-9050 | 5.0% |
| Wax dissolving medium: YS Oil DA | 25.0% |
| Solvent compatible with glycolether: 3-methyl-3-methoxy-1-butanol | 70.0% |

<Reprecipitated Particle Dispersion-16 of Wax Other than Olefinic Wax> for Comparative Example By using the same procedure as used in <Dispersion of reprecipitated olefinic wax particles-1>, except that the olefinic wax was replaced with LA05, which is an olefinic wax, and the solvent 3-methyl-3-methoxy-1-butanol was replaced with xylene, a dispersion was prepared.

| | |
|---|---|
| Wax: Neowax LA05 | 5.0% |
| Wax dissolving medium: YS Oil DA | 25.0% |
| Solvent: xylene | 68.0% |
| Dispersant for surface coating: POE(5)lanoline alcohol | 2.0% |

<Dispersion of Reprecipitated Olefinic Wax Particles-17> for Comparative Example By using the same procedure as used in <Dispersion of reprecipitated olefinic wax particles-1>, except that the olefinic wax was replaced with an olefinic wax 30200B and the wax dissolving medium YS Oil DA was replaced with polypropylene glycol, a dispersion was prepared.

| | |
|---|---|
| Olefinic wax: 30200B | 5.0% |
| Olefinic wax dissolving medium: Polypropylene glycol (molecular weight: 400) | 25.0% |
| Solvent compatible with glycolether: 3-methyl-3-methoxy-1-butanol | 68.0% |
| Dispersant for surface coating: POE(5)lanoline alcohol | 2.0% |

<Dispersion of Reprecipitated Olefinic Wax Particles-18> for Comparative Example A dispersion of olefinic wax reprecipitated particles was not added and 5% by weight of only 3-methyl-3-methoxy-1-butanol was added.

The ink composition for evaluation to be mixed with the wax particle dispersion had the following formulation.

<Ink Composition for Evaluation-1>

| | |
|---|---|
| Spiron Violet C-RH [Hodogaya Chemical Co., Ltd.] | 8.0% |
| Spiron Yellow C-GNH Hodogaya Chemical Co., Ltd.] | 5.0% |
| Printex #35 [Degussa Co.] | 8.0% |
| Polyvinyl butyral BL-1 [SEKISUI CHEMICAL CO., LTD.] | 4.0% |
| HIRACK 110H [Hitachi Chemical Co., Ltd.] | 5.0% |
| GWIS-125 [NIHON EMULSION CO., LTD.] | 5.0% |
| 3-methyl-3-methoxy-1-butanol | 65.0% |

<Ink Composition for Evaluation-2>

| | |
|---|---|
| Spiron Blue C-RH [Hodogaya Chemical Co., Ltd.] | 8.0% |
| Spiron Violet C-RH [Hodogaya Chemical Co., Ltd.] | 4.0% |
| Chromophthal Blue A-3R [Ciba-Geigy Corporation] | 8.0% |
| Polyvinyl butyral BL-1 [SEKISUI CHEMICAL CO., LTD.] | 4.0% |
| HIRACK 110H [Hitachi Chemical Co., Ltd.] | 8.0% |
| Oleic acid | 0.5% |
| Ethylene glycol monophenyl ether | 5.0% |
| 3-methyl-3-methoxy-1-butanol | 62.5% |

<Ink Composition for Evaluation-3>

| | |
|---|---|
| Spiron Violet C-RH [Hodogaya Chemical Co., Ltd.] | 10.0% |
| Chromophthal Violet B [Ciba-Geigy Corporation] | 5.0% |
| Polyvinyl butyral BL-S [SEKISUI CHEMICAL CO., LTD.] | 3.0% |
| HIRACK 110H [Hitachi Chemical Co., Ltd.] | 8.0% |
| Ethylene glycol monophenyl ether | 5.0% |
| 3-methoxybutanol | 13.0% |
| 3-methyl-3-methoxy-1-butanol | 56.0% |

<Ink Composition for Evaluation-4>

| | |
|---|---|
| Spiron Violet C-RH [Hodogaya Chemical Co., Ltd.] | 8.0% |
| Spiron Yellow C-GNH [Hodogaya Chemical Co., Ltd.] | 5.0% |
| Printex #35 [Degussa Co.] | 8.0% |
| Polyvinyl butyral BL-1 [SEKISUI CHEMICAL CO., LTD.] | 4.0% |
| HIRACK 110H [Hitachi Chemical Co., Ltd.] | 5.0% |
| 3-methoxybutanol | 10.0% |
| 3-methyl-3-methoxy-1-butanol | 60.0% |

To these ink compositions for evaluation, dispersions of examples and comparative examples were added to prepare final ink compositions Examples 1 to 40 and Comparative Examples 1 to 32. The formulation of the final ink composition is as follows.

| | |
|---|---|
| Wax particle dispersion: | 5% by weight |
| Ink composition for evaluation: | 95% by weight |

The evaluation results of combinations of various ink compositions for evaluation and dispersions of examples and comparative examples are summarized in tables hereinafter. Please refer to the tables.

After filling with the inks thus obtained in the examples and comparative examples, the following evaluation tests were carried out.

The ball point pen used in the evaluation tests comprises a polypropylene tube having an inner diameter of 1.60 mm and a stainless steel tip (the ball is made of a cemented carbide and has a diameter of 1.0 mm). After filling with the ink, the ball point pen was allowed to stand at 15° C. and 65% for 30 minutes and then the following evaluations were carried out.

1) Evaluation of Starving at the Starting of Writing (Sensory Evaluation)

The characters "MITSUBISHI" was Drawn and the Degree of starving of the characters was evaluated according to the following criteria.

A: starving scarcely occurred (no starving occurred before drawing a second line of the letter "M")

B: starving slightly occurred (no starving occurred before the letter "B")

C: very severe starving occurred (the word "MITSUBISHI" could not be drawn since starving occurred)

2) Evaluation of Starving at the Starting of Writing (Mechanical Evaluation)

Under the conditions of 25° C. and 65%, the pen was set at an angle of 60° and paper contacted with the pen was moved at a rate of 2 m/min under a load of 200 g, and then the drawn line was observed. The distance from the starting point to the draw line at the starting of writing was measured. Five pens were used and the average was calculated to obtain a measured value.

After filling with ink, the pen was allowed to stand for one day so as to observe long-term starving.

A: measured value≦50 mm

B: 50 mm≦measured value≦100 mm

C: 100 mm<measured value

3) Evaluation of Writing Properties/Splitting (Sensory Evaluation)

Using PPC paper, a spiral line was continuously drawn at room temperature. The degree of splitting (portion in which no ink is transferred when writing) was observed and evaluated according to the following criteria.

A: very slight splitting occurred

B: slightly severe splitting occurred

C: very severe splitting occurred

4) Evaluation of Stability at Low Temperature, Writing Properties/Splitting (Sensory Evaluation)

One hour after standing in an ambient environment at 0° C. for 3 days, using PPC paper, a spiral line was continuously drawn at room temperature. The degree of splitting (portion in which no ink is transferred when writing) was observed and evaluated according to the following criteria.

A: very slight splitting occurred

B: slightly severe splitting occurred

C: very severe splitting occurred

5) Evaluation of Stability at Low Temperature, Ink Vapor-Liquid Interface and Sediment (Sensory Evaluation)

A prepared ink composition was sealed and stored in a 20 ml glass bottle, and then allowed to stand in a constant-temperature bath at a temperature of 0° C. and 50° C. for 12 hour cycles for two weeks. After being taken out of the constant-temperature bath, the ink composition was observed to determine whether or not foreign material was formed on the vapor-liquid interface. The ink composition was also observed to determine whether or not sediment formed while agitating by scooping up the bottom using a metal spatula, and then evaluation was carried out according to the following criteria.

A: foreign material and sediment on vapor-liquid interface cannot be confirmed or were not formed B: foreign material and sediment on vapor-liquid interface cannot be slightly confirmed C: foreign material and sediment on vapor-liquid interface cannot be clearly confirmed These evaluation results are shown in the following tables

|  | Examples |  |  |  |  |  |  |  |  |  | Comparative Examples |  |  |  |  |  |  |  |
|---|---|---|---|---|---|---|---|---|---|---|---|---|---|---|---|---|---|---|
| No. | 1 | 2 | 3 | 4 | 5 | 6 | 7 | 8 | 9 | 10 | 1 | 2 | 3 | 4 | 5 | 6 | 7 | 8 |
| Ink composition for evaluation | 1 | 1 | 1 | 1 | 1 | 1 | 1 | 1 | 1 | 1 | 1 | 1 | 1 | 1 | 1 | 1 | 1 | 1 |
| Olefinic wax dispersion | 1 | 2 | 3 | 4 | 5 | 6 | 7 | 8 | 9 | 10 | 11 | 12 | 13 | 14 | 15 | 16 | 17 | 18 |
| 1) Evaluation | A | A | A | A | A | A | A | A | A | A | A | A | A | A | A | A | — | C |
| 2) Evaluation | A | A | A | A | A | A | A | A | A | A | A | A | A | A | A | B | — | C |
| 3) Evaluation | A | A | A | A | A | A | A | A | A | B | B | B | B | B | B | B | — | A |
| 4) Evaluation | A | A | A | A | A | A | A | A | A | C | C | C | C | C | C | C | — | A |
| 5) Evaluation | A | A | A | A | A | A | A | A | A | C | C | C | C | C | C | A | — | A |

|  | Examples |  |  |  |  |  |  |  |  |  | Comparative Examples |  |  |  |  |  |  |  |
|---|---|---|---|---|---|---|---|---|---|---|---|---|---|---|---|---|---|---|
| No. | 11 | 12 | 13 | 14 | 15 | 16 | 17 | 18 | 19 | 20 | 9 | 10 | 11 | 12 | 13 | 14 | 15 | 16 |
| Ink composition for evaluation | 2 | 2 | 2 | 2 | 2 | 2 | 2 | 2 | 2 | 2 | 2 | 2 | 2 | 2 | 2 | 2 | 2 | 2 |
| Olefinic wax dispersion | 1 | 2 | 3 | 4 | 5 | 6 | 7 | 8 | 9 | 10 | 11 | 12 | 13 | 14 | 15 | 16 | 17 | 18 |
| 1) Evaluation | A | A | A | A | A | A | A | A | A | A | A | A | A | A | A | A | — | C |
| 2) Evaluation | A | A | A | A | A | A | A | A | A | A | A | A | A | A | A | B | — | C |
| 3) Evaluation | A | A | A | A | A | A | A | A | A | B | B | B | B | B | B | B | — | A |
| 4) Evaluation | A | A | A | A | A | A | A | A | A | C | C | C | C | C | C | C | — | A |
| 5) Evaluation | A | A | A | A | A | A | A | A | A | C | C | C | C | C | C | A | — | A |

|  | Examples No. | | | | | | | | | | Comparative Examples | | | | | | | |
|---|---|---|---|---|---|---|---|---|---|---|---|---|---|---|---|---|---|---|
|  | 21 | 22 | 23 | 24 | 25 | 26 | 27 | 28 | 29 | 30 | 17 | 18 | 19 | 20 | 21 | 22 | 23 | 24 |
| Ink composition for evaluation | 3 | 3 | 3 | 3 | 3 | 3 | 3 | 3 | 3 | 3 | 3 | 3 | 3 | 3 | 3 | 3 | 3 | 3 |
| Olefinic wax dispersion | 1 | 2 | 3 | 4 | 5 | 6 | 7 | 8 | 9 | 10 | 11 | 12 | 13 | 14 | 15 | 16 | 17 | 18 |
| 1) Evaluation | A | A | A | A | A | A | A | A | A | A | A | A | A | A | A | A | — | C |
| 2) Evaluation | A | A | A | A | A | A | A | A | A | A | A | A | A | A | A | B | — | C |
| 3) Evaluation | A | A | A | A | A | A | A | A | A | A | B | B | B | B | B | B | — | A |
| 4) Evaluation | A | A | A | A | A | A | A | A | A | A | C | C | C | C | C | C | — | A |
| 5) Evaluation | A | A | A | A | A | A | A | A | A | A | C | C | C | C | C | A | — | A |

|  | Examples No. | | | | | | | | | | Comparative Examples | | | | | | | |
|---|---|---|---|---|---|---|---|---|---|---|---|---|---|---|---|---|---|---|
|  | 31 | 32 | 33 | 34 | 35 | 36 | 37 | 38 | 39 | 40 | 25 | 26 | 27 | 28 | 29 | 30 | 31 | 32 |
| Ink composition for evaluation | 4 | 4 | 4 | 4 | 4 | 4 | 4 | 4 | 4 | 4 | 4 | 4 | 4 | 4 | 4 | 4 | 4 | 4 |
| Olefinic wax dispersion | 1 | 2 | 3 | 4 | 5 | 6 | 7 | 8 | 9 | 10 | 11 | 12 | 13 | 14 | 15 | 16 | 17 | 18 |
| 1) Evaluation | A | A | A | A | A | A | A | A | A | A | A | A | A | A | A | A | — | C |
| 2) Evaluation | A | A | A | A | A | A | A | A | A | A | A | A | A | A | A | B | — | C |
| 3) Evaluation | A | A | A | A | A | A | A | A | A | A | B | B | B | B | B | B | — | A |
| 4) Evaluation | A | A | A | A | A | A | A | A | A | A | C | C | C | C | C | C | — | A |
| 5) Evaluation | A | A | A | A | A | A | A | A | A | A | C | C | C | C | C | A | — | A |

Note)
Comparative Examples 7, 15, 23 and 31: A dispersion could not be prepared since fluidity became poor in the stage where a wax is dissolved.

As can be seen from these results, the ink compositions of Examples 1 to 40 within the scope of the present invention are extremely excellent in resistance to starving at the starting of writing and give softness in drawn lines and smooth writing touch, and also noticeably suppress splitting when writing because of good stability of the ink composition.

Therefore, according to the present invention, unlike a conventional method, an ink composition is provided which suppresses starving at the starting of writing and gives softness in drawn lines and smooth writing touch, and also noticeably suppresses splitting when writing because of good stability of the ink composition.

What is claimed is:

1. An oil-based ink composition comprising a solvent represented by the following structural formula (1):

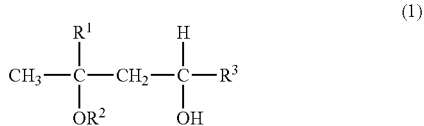

(1)

wherein $R^1$, $R^2$, and $R^3$ each independently represents H or $CH_3$, and wherein the solvent has a vapor pressure of 0.1 mmHg or more at 25° C. and accounts for 50% by mass or more of the entire solvent in the ink composition, a colorant selected from the group consisting of a pigment, a dye, and a mixture of the pigment and the dye, a nonpolar medium selected from a monoterpene-based solvent and a liquid terpene-based resin, and resin, the oil-based ink composition further comprising a dispersion of reprecipitated olefinic wax particles.

2. The oil-based ink composition according to claim 1, wherein the amount of the dispersion of reprecipitated olefinic wax particles is from 0.001 to 30% in terms of a solid content of an olefinic wax based on the total amount of the ink composition.

3. A writing instrument comprising the oil-based ink composition according to claim 1.

* * * * *